United States Patent [19]

Hattori et al.

[11] 4,136,651

[45] Jan. 30, 1979

[54] ADDITIONAL AIR CONTROL APPARATUS

[75] Inventors: Tadashi Hattori, Okazaki; Takamichi Nakase, Gamagori; Hiroaki Yamaguchi, Aichi, all of Japan

[73] Assignee: Nippon Soken, Inc., Nishio, Japan

[21] Appl. No.: 729,871

[22] Filed: Oct. 5, 1976

[30] Foreign Application Priority Data

Oct. 16, 1975 [JP] Japan .................................. 50-125133

[51] Int. Cl.² .................... F02M 7/00; F02M 13/04; F02B 75/10; F02M 3/00
[52] U.S. Cl. ..................... 123/119 EC; 123/32 EE; 123/124 R; 123/119 D
[58] Field of Search ........ 123/119 EC, 119 D, 124 R, 123/124 B, 124 A, 32 EE; 60/276, 290

[56] References Cited

U.S. PATENT DOCUMENTS

| 3,921,612 | 11/1975 | Aono ............................. 123/119 EC |
| 4,036,186 | 7/1977 | Hattori et al. .................... 123/124 R |
| 4,065,920 | 1/1978 | Minami et al. ................ 123/119 EC |

FOREIGN PATENT DOCUMENTS

| 2651340 | 5/1977 | Fed. Rep. of Germany ...... 123/119 D |
| 2651339 | 5/1977 | Fed. Rep. of Germany ...... 123/119 D |

*Primary Examiner*—Wendell E. Burns
*Attorney, Agent, or Firm*—Cushman, Darby & Cushman

[57] ABSTRACT

An additional air supply control apparatus for an internal combustion engine including a bypass passage for supplying air additionally to the engine and a control valve provided in the bypass passage for controlling the amount of air-flow through the bypass passage. A gas sensor is mounted in an exhaust system of the engine for detecting changes in the air-fuel ratio and a control unit produces an intermittent control signal in accordance with a detection signal from the gas sensor. The control valve is driven by the control signal intermittently in a skip movement fashion.

9 Claims, 9 Drawing Figures

ADDITIONAL AIR CONTROL APPARATUS

The present invention relates to additional air control apparatus and more particularly to an additional air control apparatus which is capable of suitable compensating the air-fuel ratio of the mixture.

To obtain the maximum of efficiency of the modified internal combustion engines heretofore proposed for automotive exhaust emission control purposes or to ensure the optimum exhaust gas cleaning efficiency of the catalyst mounted in engines for exhaust emission control purposes, the air-fuel ratio of the mixture supplied to the engine must always be controlled properly or the amount of secondary air supplied into the catalytic converter must be controlled properly.

In a control apparatus of the above type heretofore proposed, the oxygen content of the exhaust gases, for example, is sensed by a gas sensor to detect the air-fuel ratio of the mixture and a control valve is operated in response to the output signal of the gas sensor to continuously control the amount of additional correcting air to gradually decrease or increase it, thus accomplishing feedback control of the air-fuel ratio of the mixture.

In this type of control apparatus, generally a motor is employed for operating the control valve and the time rate of change of the controlled air-fuel ratio is dependent on the rate of change of the passage area for the additional air flow which is controlled by the motor. Consequently, the control of air-fuel ratio is accomplished by presetting the motor driving speed to the optimum speed so that the control range of air-fuel ratio is minimized under the steady-state conditions as well as the transient conditions.

However, the conventional control apparatus of this type is disadvantageous in that since the apparatus employs an integral control system which controls the air-fuel ratio continuously and moreover the effects of other factors are not practically taken into consideration, even if the driving speed is preset to the optimum value as mentioned previously, due to the fixed driving speed, the air-fuel ratio is varied considerably under the effect of a factor, e.g., a delay time between the occurrence of a change of the air-fuel ratio in the intake system and the time that the gas sensor senses the change in the exhaust system, thus failing to ensure satisfactory control of the air-fuel ratio.

Particularly, in the light load, low rotational speed range where the amount of intake air is small, the delay time is increased causing a hunting phenomenon and thereby failing to ensure full display of the cleaning ability of the catalyst and moreover a surging phenomenon is caused during running of the vehicle with the resulting deterioration of its drivability. Thus, there is much room for improvements on this type of control apparatus.

With a view to overcoming the foregoing difficulty, it is an object of this invention to provide an additional air control apparatus wherein the driving direction of the control valve is controlled by detecting the air-fuel ratio and the driving and stopping of a control valve is alternately and intermittently controlled in a skip fashion to satisfactorily control the amount of additional air supply under the steady-state conditions as well as the transient conditions so that as for example, the control range of the air-fuel ratio is always maintained small and thus the air-fuel ratio is maintained constant.

It is another object of this invention to provide such improved additional air control apparatus wherein the ratio of a driving time period to a rest period of the control valve is controlled in response to a delay time factor (e.g., the amount of intake air, engine rotational speed, intake manifold vacuum, venturi vacuum, throttle position or the like) to eliminate any inconvenience due to the delay time factor and ensure satisfactory control of the additional air flow, thus ensuring full display of the ability of the catalyst and eliminating the occurrence of any surging phenomenon in the light load, low speed range of the engine to ensure an improved drivability.

It is still another object of this invention to provide such improved additional air control apparatus wherein the repetition period of the on-off control is fixed and any one of the running time and the stopping time of the driving means is controlled by delay time detecting means in such a manner that the ratio between the running time and the stopping time of the driving means is easily controlled and moreover the control is effected with a simple circuit construction.

In accordance with the present invention, an additional air control apparatus for an internal combustion engine having an intake system, air-fuel mixture supply system and exhaust system comprising a bypass passage for supplying air additionally to the engine, a control valve provided in said bypass passage for controlling an amount of additional air, gas sensing means mounted in the exhaust system for sensing the oxygen content in exhaust gases flowing therethrough, a control unit electrically connected to said gas sensing means for generating an intermittent control signal, and driving means electrically connected to said control unit and coupled to said control valve for driving said control valve to open or close in accordance with said intermittent control signal, said control valve being driven to an opening or closing position in a skip movement fashion and time periods of driven and rest are alternately repeated intermittently.

These and other objects, features and advantages of this invention will become readily apparent from the following detailed description taken in conjunction with the accompanying drawings, in which.

Figure 1:
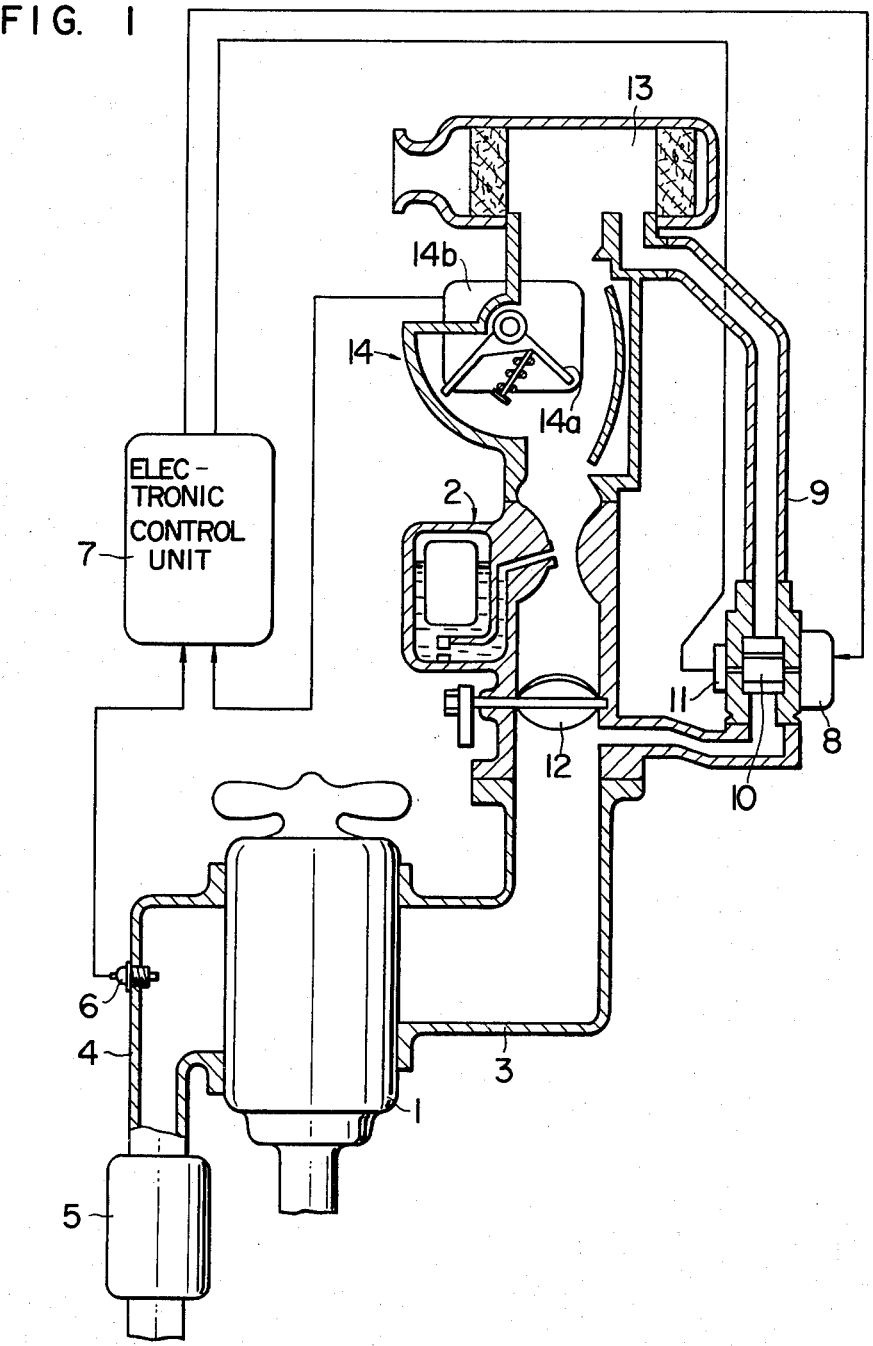
FIG. 1 is a schematic diagram showing the overall construction of an embodiment of this invention.

Referring to FIG. 1 illustrating the overall system of the invention, an internal combustion engine 1 is the conventional spark-ignition, four-cycle engine and air-fuel mixture is supplied to the engine 1 by a carburetor 2 through an intake manifold 3. The carburetor 2 having a main passage, is of the conventional type and it has been set to produce an air-fuel mixture which is slightly rich as compared with the desired air-fuel ratio demanded by the engine 1.

Figure 8:
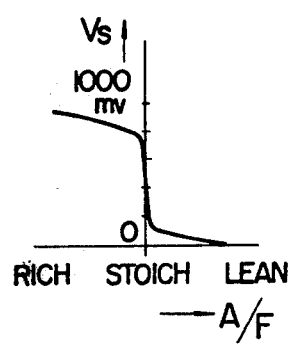
FIG. 8 is an output characteristic diagram of the gas sensor shown in FIG. 6.

Disposed in the exhaust system of the engine 1 are an exhaust manifold 4 and a three-way catalytic converter 5 and also mounted in the exhaust manifold 4 is a gas sensor 6 which detects by a metal oxide such as zirconium dioxide or titanium dioxide the content of oxygen, a constituent, of the exhaust gases. Where the gas sensor 6 employs zirconium dioxide, for example, as shown in FIG. 8, the gas sensor 6 comes into operation at around the stoichiometric air-fuel ratio so that when the detected air-fuel ratio is rich (small) as compared with the stoichiometric one, it produces an electromotive force between 80 and 100 mV, whereas when the detected air-fuel ratio is lean (large) as compared with the stoichiometric one, the resulting electromotive force is on the order of 10 to 0 mV. An electronic control unit 7 is responsive to the signals from the gas sensor 6, etc., to drive a four-phase pulse motor 8 in a selected direction. The pulse motor 8 operates a control valve 10 mounted in an additional air passage or a bypass passage 9 to open and close and the drive shaft of the pulse motor 8 is connected to the control valve 10. The control valve 10 is a known butterfly valve and there is provided a full closed position switch 11 so that when the control valve 10 is in its fully closed position, this is detected and a full closed position signal is produced and applied to the control unit 7.

A throttle valve 12 is mounted in the downstream portion of the carburetor 2 and the upstream portion of the carburetor 2 includes an air cleaner 13 and an air flow meter 14 constituting delay time detecting means. The additional air passage 9 is disposed to communicate the air cleaner 13 with the downstream side of the throttle valve 12.

The air flow meter 14 directly measures the mass air flow through the intake pipe by a rotatably mounted measuring flap 14a and the amount of movement of the flap 14a is converted into an electric signal by a potentiometer 14b thus detecting the amount of intake air. The output terminal of the potentiometer 14b is electrically connected to the control unit 7.

Figure 2:
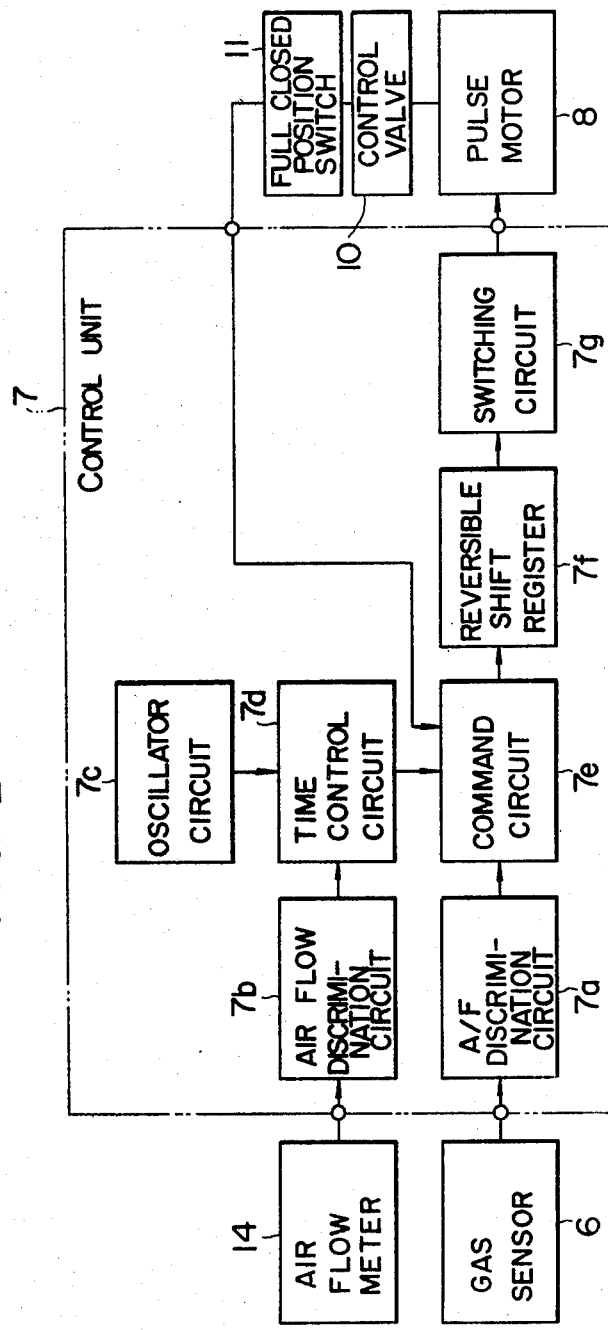
FIG. 2 is a block diagram of the electronic control unit shown in FIG. 1.
Figure 3:
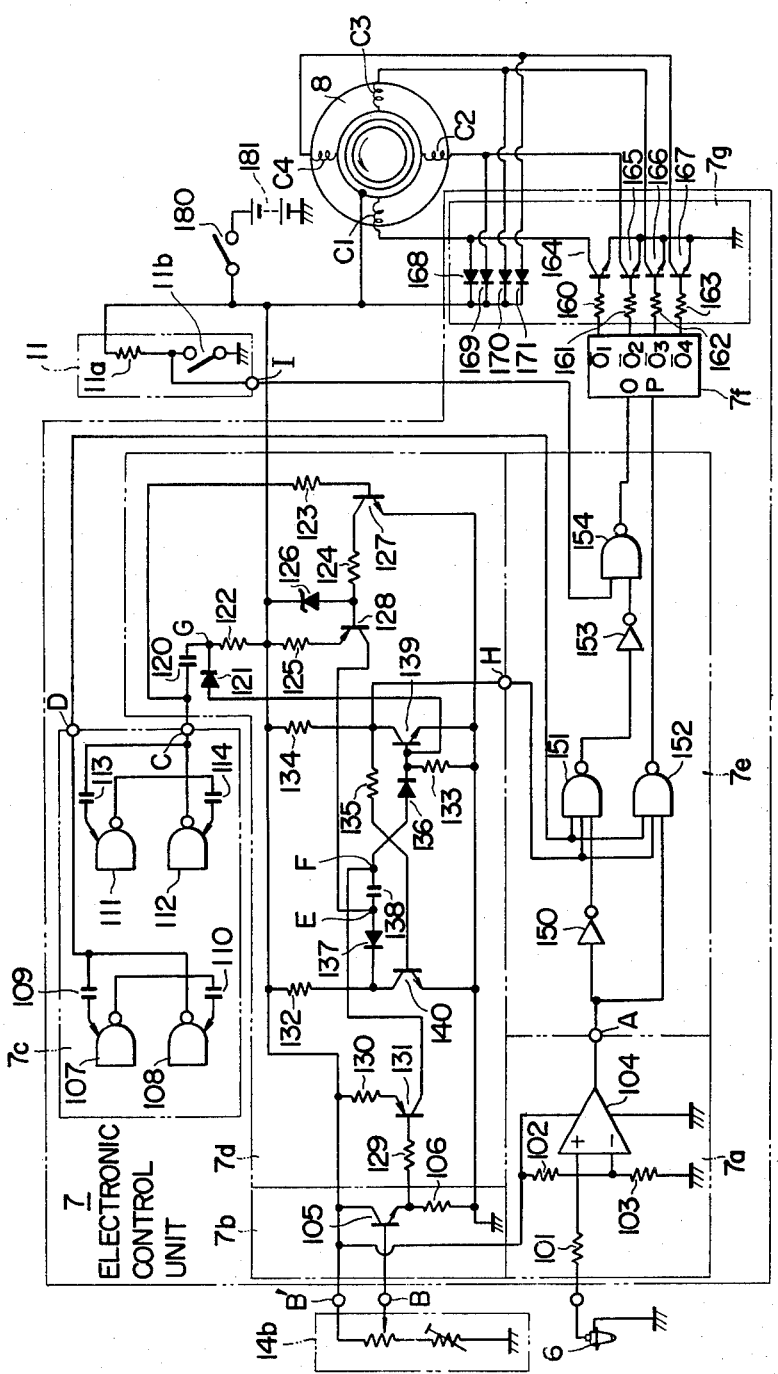
FIG. 3 is a wiring diagram of the electronic control unit shown in FIG. 1.

Next, the control unit 7 will be described with reference to the block diagram shown in FIG. 2. The control unit 7 receives as its input signals the output signal of the gas sensor 6, the output signal of the air flow meter 14 for measuring the amount of intake air corresponding to the delay time factor and the output signal of the full closed position switch 11, and the control unit 7 comprises an A/F discrimination circuit 7a, and air flow discrimination circuit 7b, an oscillator circuit 7c, a time control circuit 7d, a command circuit 7e, a reversible shift register 7f and a switching circuit 7g, thereby operating the pulse motor 8 in accordance with the input signals.

With this construction, basically the air-fuel mixture produced in the carburetor 2 is burned in the combustion chambers of the engine 1 and thereafter any change in the air-fuel ratio is detected in the exhaust system by the gas sensor 6 whose output signal is in turn applied to the A/F discrimination circuit 7a where the air-fuel ratio is determined whether it is rich or lean as compared with the preset air-fuel ratio to be controlled (the stoichiometric air-fuel ratio in this embodiment), so that when the air-fuel ratio is rich, the pulse motor 8 operates the control valve 10 mounted in the additional air passage 9 in a direction which opens it, whereas when the air-fuel ratio is lean the control valve 10 is operated in a direction which closes it, thus compensating the air-fuel ratio to attain the preset air-fuel ratio by means of the additional air supplied to the downstream side of the throttle valve 12.

In this case, the time control circuit 7d determines the running and stopping times of the pulse motor 8 in response to the signal from the air flow meter 14, so that the running and stopping of the pulse motor 8 are alternately and intermittently controlled in a skip fashion through the command circuit 7e, the reversible shift register 7f and the switching circuit 7b and the control range of the air-fuel ratio is reduced to attain the preset air-fuel ratio.

The control unit 7 will now be described in greater detail with reference to FIGS. 3 to 7. The A/F discrimination circuit 7a comprises an input resistor 101, voltage dividing resistors 102 and 103, and a differential operational amplifier (OP AMP) 104, and the OP AMP 104 has its noninverting input terminal connected to the gas sensor 6 through the input resistor 101 and its inverting terminal to the voltage dividing point of the dividing resistors 102 and 103. Thus, the A/F discrimination circuit 7a compares its input voltage with a preset voltage preset by the voltage dividing resistors 102 and 103 (i.e., the voltage practically equal to the electromotive force produced by the gas sensor 6 at the stoichiometric air-fuel ratio), so that a "1" level signal is produced at its output terminal A when the input voltage is higher than the preset voltage or richer than the stoichiometric one, whereas a "0" level signal is produced at the output terminal A when it is lower than the preset voltage or leaner than the stoichiometric one.

The air flow discrimination circuit 7b comprises an emitter-follower circuit including a transistor 105 and an emitter resistor 106 and the base of the transistor 105 is connected to a variable terminal B of the potentiometer 14b of the air flow meter 14. Thus, the potential difference between the variable terminal B and a fixed terminal B' which is inversely proportional to the amount of intake air, is detected and applied to the time control circuit 7d.

The oscillator circuit 7c comprises a first oscillator including NAND gates 107 and 108 with expander terminals and capacitors 109 and 110 constituting an astable multivibrator and a second oscillator including NAND gates 111 and 112 and capacitors 113 and 114 constituting an astable multivibrator.

Figure 4:
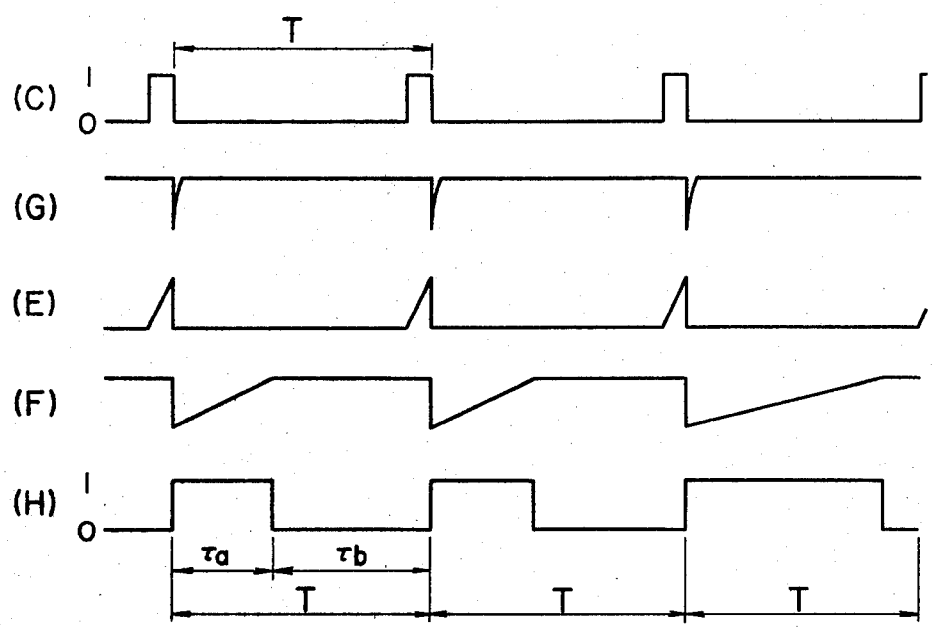
FIG. 4 is a waveform diagram useful in explaining the operation of the electronic control unit.
Figure 5A:
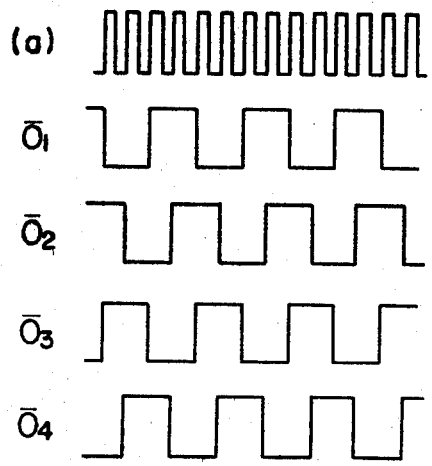
FIGS. 5A and 5B are waveform diagrams useful in explaining the operation of the reversible shift register shown in FIG. 3.
Figure 5B:
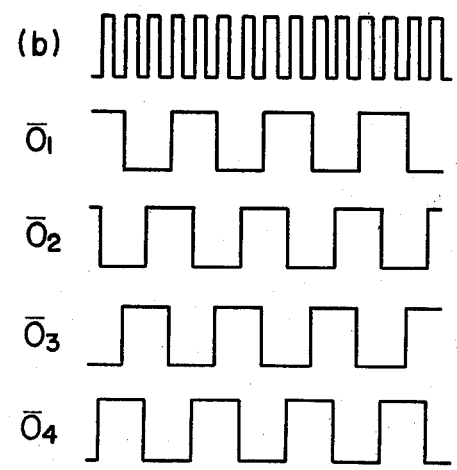

The first oscillator produces pulses for driving the pulse motor 8 and its output waveform at its output terminal D consists of pulses having a duty ratio of 1 : 1 as shown in (a) and (b) of FIGS. 5A and 5B, respectively. The second oscillator produces pulses for controlling the running time of the pulse motor 8 and its output waveform at its output terminal C has a large duty ratio as shown in (c) of FIG. 4 with its period T being preset longer than that of the pulses produced from the first oscillator.

The time control circuit 7d comprises a trigger generating circuit including a capacitor 120, a diode 121 and a resistor 122, a charging circuit including resistors 123, 124 and 125, a Zener diode 126 and transistors 127 and 128, a discharging circuit including resistors 129 and 130 and a transistor 131, and a monostable circuit including resistors 132, 133, 134 and 135, diodes 136 and 137, a capacitor 138 and transistors 139 and 140 and it produces a pulse having a pulse width $\tau a$ corresponding to the amount of intake air as shown in (H) of FIG. 4.

When the output at the output terminal C of the second oscillator goes to the "1" level, the transistors 127 and 128 of the charging circuit are turned on and a constant current determined by the Zener diode 126 flows to the monostable circuit. In the monostable circuit, the capacitor 138 is charged with the constant current and the capacitor potential increases as shown in (E) of FIG. 4. During this time interval, a constant current determined by the potentiometer 14b of the air flow meter 14 and inversely proportional to the amount of intake air is supplied to the monostable circuit from the discharging circuit and the transistor 139 is turned on through the diode 136. Then, when the output rectangular pulse of the second oscillator shown in (C) of FIG. 4 goes to the "0" level, the transistors 127 and 128 are turned off so that a negative trigger signal is produced at a terminal G of the trigger generating circuit as shown in (G) of FIG. 4 on completion of the charge of the capacitor 138 and the transistor 139 is turned off. Thus, the output derived from the collector of the transistor 139 and produced at an output terminal H of the time control circuit 7d goes from the "0" to "1" level.

On the other hand, in response to the turning off of the transistor 139 the transistor 140 is turned on and the potential across the capacitor 138 drops rapidly. When this occurs, the charge stored in the capacitor 138 is discharged and dissipated by a discharge current corresponding to the amount of intake air and thereafter the discharge potential rises as shown in (F) of FIG. 4 and the transistor 139 is again turned on.

In this way, during the time that the transistor 139 remains off, the output of the time control circuit 7d remains at the "1" level thus producing a drive pulse signal having a pulse width $\tau a$ as shown in (H) of FIG. 4 and this drive pulse width $\tau a$ is proportional to the amount of intake air as mentioned previously.

The full closed position switch 11 comparises a resistor 11a and a switch 11b so that when the control valve 10 is brought into the full closed position, the switch 11b is closed and the output at its output terminal I goes to the "0" level.

The output signals of the A/F discrimination circuit 7a, the oscillator circuit 7c, the time control circuit 7d and the full closed position switch 11 are applied to the command circuit 7e which in turn produces the required forward, reverse and stop signals for the pulse motor 8.

The command circuit 7e comprises inverters 150 and 153 and NAND gates 151, 152 andd 154 which constitute a control logic for the pulse motor 8. In this circuit, the NAND gates 152 has its three input terminals respectively connected to the output terminal A of the A/F discrimination circuit 7a, the output terminal D of the first oscillator of the oscillator circuit 7c and the output terminal H of the time control circuit 7d and the output terminal of the NAND gate 152 is connected to an input terminal P of the reversible shift register 7f. Thus, when the outputs of the A/F discrimination circuit 7a and the time control circuit 7d are both at the "1" level, the output pulses of the first oscillator are transmitted to the input terminal P of the reversible shift register 7f through the NAND gate 152.

On the other hand, the NAND gate 151 has its three input terminals respectively connected to the output terminal A of the A/F discrimination circuit 7a through the inverter 150, the output terminal D of the first oscillator of the oscillator circuit 7c and the output terminal H of the time control circuit 7d and the output terminal of the NAND gate 151 is connected to one input terminal of the NAND gate 154 through the inverter 153. The other input terminal of the NAND gate 154 is connected to the output terminal I of the full closed position switch 11 and its output terminal is connected to an input terminal 0 of the reversible shift register 7f. Consequently, when the output of the A/F discrimination circuit 7a goes to the "0" level and the output of the time control circuit 7d goes to the "1" level, the output pulses of the first oscillator are applied to the NAND gate 154 so that these pulses are applied to the input terminal 0 of the reversible shift register 7f when the full closed position switch 11 goes to the "1" level. When the pulse signals are applied to the input terminal P of the reversible shift register 7f, its output terminals $\bar{0}_1$, $\bar{0}_2$, $\bar{0}_3$ and $\bar{0}_4$ are sequentially shifted as shown in FIG. 5A. On the contrary, when the pulse signals are applied to the input terminal 0, the output terminals $\bar{0}_4$, $\bar{0}_3$, $\bar{0}_2$ and $\bar{0}_1$ are sequentially shifted as shown in FIG. 5B. These output terminals $\bar{0}_1$, $\bar{0}_2$, $\bar{0}_3$ and $\bar{0}_4$ are connected to the switching circuit 7g comprising resistors 160, 161, 162 and 163, transistors 164, 165, 166 and 167 and back electromotive force absorbing diodes 168, 169, 170 and 171 and the switching circuit 7g is in turn connected to field coils $C_1$, $C_2$, $C_3$ and $C_4$ of the four-phase pulse motor 8. When the pulse signals are applied to the input terminal P of the reversible shift register 7f, the transistors 164, 165, 166 and 167 are sequentially turned on and the field coils $C_1$, $C_2$, $C_3$ and $C_4$ are similarly energized two phases at a time, thus rotating the rotor of the pulse motor 8 in the direction of the arrow in FIG. 3 and thereby rotating the control valve 10 in the direction which opens it. On the contrary, when the pulse signals are applied to the terminal 0, the rotor of the pulse motor 8 is rotated in a direction opposite to the direction of the arrow and the control valve 10 is rotated in the direction which closes it.

During this operation, when the control valve 10 is brought into its full closed position, the switch 11b of the full closed position switch 11 is closed so that the NAND gate 154 of the command circuit 7e is closed and the pulse motor 8 is prevented from rotating the control valve 10 further in the valve closing direction thus ensuring normal operation of the control valve 10.

The control unit 7 and the pulse motor 8 are supplied with power from a D.C. power source 181 by way of an ignition key switch 180 of the engine 1.

It will thus be seen that in accordance with the invention the period T is determined by the pulse output of the second oscillator shown in (C) of FIG. 4 so that the pulse motor 8 is rotated only for the duration of the pulse width $\tau a$ which is proportional to the amount of intake air corresponding to the delay time and the pulse motor 8 is stopped in its new position during a time period T minus $\tau a$ (T - $\tau a$). The pulse motor 8 is controlled by repeating this on-off control at the period T.

With the conventional apparatus employing the integral control system in which the opening of the control valve 10 is gradually decreased or increased, the feedback control of the additional air flow is delayed due to the effect of the delay time and thus the air-fuel ratio is caused to swing considerably on both sides of the desired air-fuel ratio. According to the control system of this invention, however, the operation is repeatedly carried out in which the pulse motor 8 causes the control valve 10 to make a skipping rotation for a given time period thus rapidly changing the opening of the control valve 10 a given amount and thereafter the control valve 10 is stopped in the resulting position for a given time period. Thus, the amount of the overshoot in the control of the additional air flow in response to a change in the output signal of the gas sensor 6 is reduced and the number of cycles of change in the air-fuel ratio is also increased, thus ensuring greatly improved response and follow-up characteristics of the air-fuel ratio control.

Figure 6:
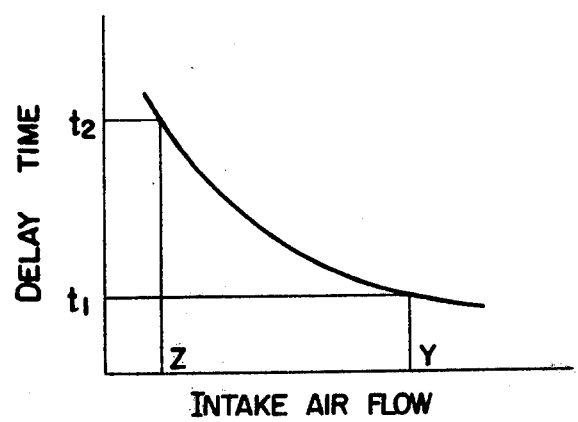
FIG. 6 is a characteristic diagram showing the relationship between the amount of intake air and the delay time.
Figure 7:
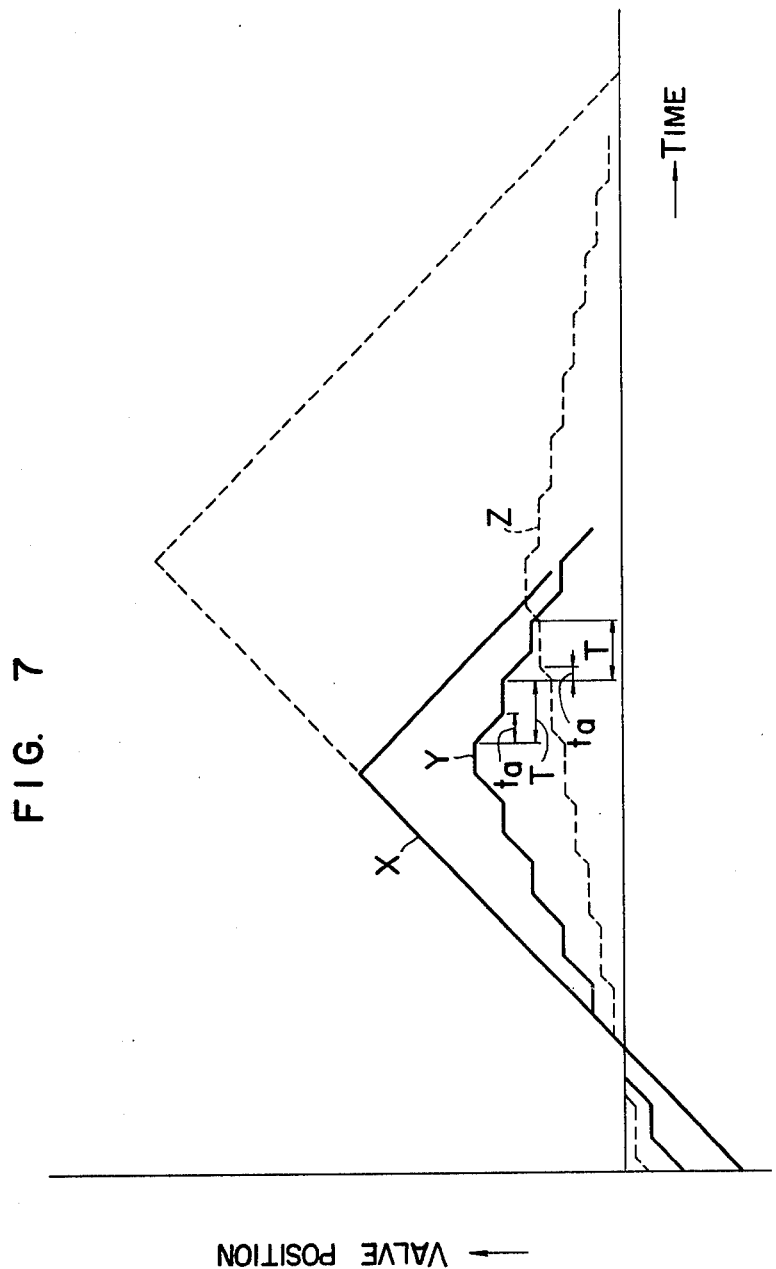
FIG. 7 is a characteristic diagram useful in explaining the operation of the embodiment shown in FIG. 1.

Further, where a delay time $t_1$ corresponds to an air flow Y and a time delay $t_2$ corresponds to an air flow Z as shown in FIG. 6, if the pulse motor driving frequency is fixed in the conventional apparatus employing a continuous control system, as indicated by a straight line X in FIG. 7, the position of the control valve is changed considerably with the resulting considerable change in the amount of the additional air supplied for compensating the air-fuel ratio by the amount of air drawn in, thus retarding the adjustment of the air-fuel ratio to the preset value and causing the control range of the air-fuel ratio to vary greatly. On the contrary, with the control apparatus of this invention, even if the driving frequency is fixed, when the amount of intake air is increased as shown in FIG. 6 during the period of acceleration, for example, as shown by a broken line Y in FIG. 7, the time $\tau a$ during which the pulse motor 8 is operated is increased within the period T in proportion to the amount of intake air so that the control speed is increased and the air-fuel ratio control range is reduced, thus ensuring rapid adjustment of the air-fuel ratio to the preset value. On the other hand, where the amount of intake air is small as shown by a dotted line Z in FIG. 6, the running time $\tau a$ of the pulse motor 8 is decreased within the period T and consequently the control range of the additional air flow can be reduced even though the delay time is increased. Thus, the air-fuel ratio can be controlled with a reduced control range under the steady-state conditions as well as the transient conditions.

The present invention is not intended to be limited to the above-described embodiment. For example, while the invention has been described as embodied in an additional air control apparatus for adjusting the air-fuel ratio of the mixture produced in a carburetor, the control apparatus can be adapted for compensating the rate of flow of the air in mechanically controlled fuel injection systems.

Further, in addition to the control of the air flow in the intake system of the engine, the control apparatus can be adapted for the control of the air flow in the exhaust system such as the control of the secondary air flow to the catalyst.

Still further, while, in the above described embodiment, a pulse motor is used as driving means, any of DC and AC motors may be used and moreover any mechanical actuator may equally be used in addition to the electrical actuators.

Still furthermore, while an air flow meter is employed as delay detecting means, sensors for sensing other delay time factors such as the intake manifold pressure, engine rotational speed, venturi vacuum, throttle position, etc., may be used singly or in any combination thereof.

We claim:

1. An additional air control apparatus for an internal combustion engine having an intake system and an exhaust system comprising:
   a carburetor connected to the intake system of an internal combustion engine including a main passage and a bypass passage, said carburetor supplying air-fuel mixture to said engine;
   said main passage being provided with a throttle valve for controlling an amount of air-flow and said bypass passage being provided with a control valve for compensating the air-fuel ratio of said air-fuel mixture by controlling an amount of additional air-flow flowing therethrough;
   gas sensing means mounted in the exhaust system of said engine for sensing the oxygen content of the exhaust gases and deriving an electrical sensing signal;
   electronic control means electrically connected to said gas sensing means for producing an intermittent output signal in accordance with said sensing signal,
   said control means including,
   an A/F discrimination circuit for comparing said sensing signal with a preset value and for generating a comparison signal in accordance with a result of the comparison,
   an oscillation circuit for generating a first and a second pulse signal of different frequencies,
   a command circuit electrically connected to said A/F discrimination circuit and said oscillation circuit for generating a forward or a reverse signal in accordance with said comparison signal of said A/F discrimination circuit, said command circuit being also adapted to combine said first and second pulse signals and to permit said first pulse signal to pass only during a time period determined by said second signal thereby to form said forward signal or said reverse signal occuring intermittently,
   a reversible shift register electrically connected to said command circuit for generating a forward shift and a reverse shift signal by shifting outputs sequentially in response to said forward and reverse signals, and
   a switching circuit electrically connected to said reversible shift register for generating a switching signal in response to said forward and reverse shift signals; and
   a pulse motor coupled to said control valve and electrically connected to said control means for alternately driving stopping said control valve in a skip movement fashion in response to said switching signal.

2. An additional air control apparatus for an internal combustion engine having an intake and an exhaust system comprising:
   a carburetor connected to the intake system of an internal combustion engine and including a main passage and a bypass passage for supplying air-fuel mixture to said engine,
   said main passage being provided with a throttle valve for controlling an amount of air-flow and said bypass passage being provided with a control valve for compensating the air-fuel ratio of said air-fuel mixture by controlling an amount of additional air-flow flowing therethrough;
   gas sensing means mounted in the exhaust system of said engine for sensing the oxygen content of the exhaust gases and deriving an electrical sensing signal;
   delay time detecting means for detecting a delay time until a change in the air-fuel ratio at the side of said carburetor is detected as a change in the oxygen content in the exhaust gases by said gas sensing means located in the exhaust system and for producing an electrical detection signal;

electronic control means electrically connected to said gas sensing means and said delay time detecting means for producing an intermittent output signal in accordance with said sensing signal and said detection signal, said electronic control means including, an A/F discrimination circuit for comparing said sensing signal with a preset valve and for generating a comparison signal in accordance with a result of the comparison, an oscillation circuit for generating a first and a second pulse signal of different frequencies, a time control circuit electrically connected to said delay time detection means and said oscillation circuit for controlling the duty ratio of said second pulse signal in accordance with said detection signal from said delay time detection means, a command circuit electrically connected to said A/F discrimination circuit, oscillation circuit and said time control circuit for combining said first pulse signal with said second pulse signal controlled by said time control circuit and for producing an intermittent forward or reverse signal by permitting said first pulse signal to pass only during a time period depending upon a delay time determined by said second pulse signal, said command circuit also being adapted to deliver said forward signal or said reverse signal in accordance with said comparison signal from said A/F discrimination circuit, a reversible shift register electrically connected to said command circuit for generating a forward and a reverse shift signal by shifting outputs sequentially in response to said forward and reverse signals, and a switching circuit electrically connected to said reversible shift register for generating a switching signal in response to said forward shift and reverse shift signals; and a pulse motor coupled to said control valve and electrically connected to said control means for alternately driving and stopping said control valve in a skip movement fashion in response to said switching signal.

3. An additional air control apparatus for an internal combustion engine having an intake system, an exhaust system and a catalytic converter for purifying exhaust gases comprising:

means for supplying air-fuel mixture to an internal combustion engine;

an air pipe adapted to supply additional air to said engine;

a control valve provided in said air pipe for controlling an amount of the additional air thereby to adjust the air-fuel ratio of the air-fuel mixture supplied to said engine;

gas sensing means mounted in said exhaust system of said engine for generating a signal in accordance with the composition of the exhaust gases flowing therethrough;

delay time detecting means for detecting a delay time until a change in the air-fuel ratio at the side of said intake system is detected as a change in the oxygen content in the exhaust gases by said gas sensing means located in said exhaust system and for producing an electrical delay detection signal;

a driving means coupled to said control valve for drive said control valve to open or close; and a control unit operatively connected to said gas sensing means said delay time detection means and said driving means for driving said driving means to an opening direction or a closing direction of said control valve in accordance with said detection signal from said gas sensing means, said control unit being adapted to drive said driving means alternately to drive in a skip fashion for a period according to said delay detection signal from said delay time detection means and to stop for another period repeatedly thereby to drive said control valve intermittently with a skip movement in accordance with the delay time.

4. An additional air control apparatus according to claim 3, wherein said control unit drives said driving means in said skip movement having a constant period.

5. An additional air control apparatus for an internal combustion engine having an intake system, an exhaust system and a catalytic converter for purifying exhaust gases comprising:

gas sensing means mounted in the exhaust system of an internal combustion engine for sensing the oxygen content in the exhaust gases flowing therethrough and for generating an electrical signal;

an air pipe for supplying additional air upstream of said gas sensing means;

a control valve provided in said air pipe for controlling an amount of the additional air;

a driving means coupled to said control valve for driving said control valve to open or close; and a control unit operatively connected to said gas sensing means and said driving means for driving said driving means to an opening direction or a closing direction of said control valve in accordance with said electrical signal from said gas sensing means, said control unit being adapted to drive said driving means to alternately drive for a period and to stop for another period repeatedly thereby to drive said control valve intermittently in a skip fashion.

6. An additional air control apparatus for an internal combustion engine having an intake system, an exhaust system and a catalytic converter for purifying exhaust gases comprising:

gas sensing means mounted in the exhaust system of an internal combustion engine for sensing the oxygen content in the exhaust gases flow therethrough and for generating an electrical signal;

an air pipe for supplying additional air to one of said systems;

a control valve provided in said air pipe for controlling an amount of the additional air;

a driving means coupled to said control valve for driving said control valve to open or close; and a control unit operatively connected to said gas sensing means and said driving means for driving said driving means to an opening direction or a closing direction of said control valve in accordance with said electrical signal from said gas sensing means, said control unit being adapted to drive said driving means to alternately drive for a period and to stop for another period repeatedly thereby to drive said control valve intermittently in a skip fashion.

7. An additional air control apparatus for an internal combustion engine having an intake system, an exhaust system and a catalytic converter for purifying exhaust gases comprising:

a carburetor, connected to the intake system of an internal combustion engine, for supplying air-fuel mixture to said engine, said carburetor being provided with a throttle valve for controlling the amount of the air-fuel mixture;

gas sensing means mounted in the exhaust system of said engine for sensing the oxygen content of the exhaust gases and producing an electrical sensing signal;

an air passage for supplying additional air to said intake system, said air passage being provided with a control valve for controlling the amount of the additional air;

electronic control means electrically connected to said gas sensing means for producing an intermittent output signal in accordance with said sensing signal, said control means including, an A/F discrimination circuit for comparing said sensing signal with a preset value and for generating a comparison signal in accordance with a result of the comparison;

an oscillation circuit for generating a first and a second pulse signal of different frequencies, a command circuit electrically connected to said A/F discrimination circuit and said oscillation circuit for generating a forward or a reverse signal in accordance with said comparison signal of said A/F discrimination circuit, said command circuit being also adapted to combine said first and second pulse signals and to permit said first pulse signal to pass only during a time period determined by said second signal thereby to form said forward signal or said reverse signal occurring intermittently, a reversible shift register electrically connected to said command circuit for generating a forward shift and a reverse shift signal by shifting outputs sequentially in response to said forward and reverse signals, and a switching circuit electrically connected to said reversible shift register for generating a switching signal in response to said forward and reverse shift signals; and a pulse motor coupled to said control valve and electrically connected to said control means for alternately driving and stopping said control valve in a skip movement fashion in response to said switching signal.

8. An additional air control apparatus for an internal combustion engine having an intake system, an exhaust system and a catalytic converter for purifying exhaust gases comprising:

a carburetor, connected to the intake system of an internal combustion engine, for supplying air-fuel mixture to said engine, said carburetor being provided with a throttle valve for controlling the amount of the air-fuel mixture;

gas sensing means mounted in the exhaust system of said engine for sensing the oxygen content of the exhaust gases and producing an electrical sensing signal;

an air passage for supplying additional air to said intake system, said air passage being provided with a control valve for controlling the amount of the additional air;

delay time detecting means for detecting a delay time until a change in the air-fuel ratio at the side of said carburetor is detected as a change in the oxygen content in the exhaust gases by said gas sensing means located in the exhaust system and for producing an electrical detection signal;

electronic control means electrically connected to said gas sensing means and said delay time detecting means for producing an intermittent output signal in accordance with said sensing signal and said detection signal;

said electronic control means including;

an A/F discrimination circuit for comparing said sensing signal with a preset value for generating a comparison signal in accordance with a result of the comparison, an oscillation circuit for generating a first and a second pulse signal of different frequencies, a time control circuit electrically connected to said delay time detection means and said oscillation circuit for controlling the duty ratio of said second pulse signal in accordance with said detection signal from said delay time detection means, a command circuit electrically connected to said A/F discrimination circuit, oscillation circuit and said time control circuit for combining said first pulse signal with said second pulse signal controlled by said time control circuit and for producing an intermittent forward or reverse signal by permitting said first pulse signal to pass only during a time period depending upon a delay time determined by said second pulse signal, said command circuit also being adapted to deliver said forward signal or said reverse signal in accordance with said comparison signal from said A/F discrimination circuit, a reversible shift register electrically connected to said command circuit for generating a forward and a reverse shift signal by shifting outputs sequentially in response to said forward and reverse signals, a switching circuit electrically connected to said reversible shift register for generating a switching signal in response to said forward shift and reverse shift signals; and a pulse motor coupled to said control valve and electrically connected to said control means for alternately driving and stopping said control valve in a skip movement fashion in response to said switching signal.

9. An additional air control apparatus for an internal combustion engine having an intake system, an exhaust system and a catalytic converter for purifying exhaust gases comprising:

a carburetor, connected to the intake system of an internal combustion engine, for supplying air-fuel mixture to said engine, said carburetor being provided with a throttle valve for controlling the amount of the air-fuel mixture;

gas sensing means mounted in the exhaust system of said engine for sensing the oxygen content of the exhaust gases and producing an electrical sensing signal;

an air passage for supplying additional air to said intake system, said air passage being provided with a control valve for controlling the amount of the additional air;

delay time detecting means for detecting a delay time until a change in the air-fuel ratio at the side of said intake system is detected as a change in the oxygen content in the exhaust gases by said gas sensing means located in said exhaust system and for producing an electrical delay detection signal; a driving means coupled to said control valve for driving said control valve to open or close; and a control unit operatively connected to said gas sensing means, said delay time detection means and said driving means for driving said driving means to an opening direction or a closing direction of said control valve in accordance with said detection signal from said gas sensing means, said control unit being adapted to drive said driving means alternatively to drive in a skip fashion for a period according to said delay detection signal from said delay time detection means and to stop for another period repeatedly thereby to drive said control valve intermittently with a skip movement in accordance with the delay time.

* * * * *